United States Patent
Shin et al.

(10) Patent No.: US 12,355,099 B2
(45) Date of Patent: Jul. 8, 2025

(54) BATTERY PACK AND DEVICE INCLUDING THE SAME

(71) Applicant: LG ENERGY SOLUTION, LTD., Seoul (KR)

(72) Inventors: Juhwan Shin, Daejeon (KR); Hyoungsuk Lee, Daejeon (KR); Donghyun Kim, Daejeon (KR); Byung Do Jang, Daejeon (KR); Yongho Chun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 555 days.

(21) Appl. No.: 17/767,344

(22) PCT Filed: Apr. 8, 2021

(86) PCT No.: PCT/KR2021/004427
§ 371 (c)(1),
(2) Date: Apr. 7, 2022

(87) PCT Pub. No.: WO2021/221342
PCT Pub. Date: Nov. 4, 2021

(65) Prior Publication Data
US 2022/0393298 A1 Dec. 8, 2022

(30) Foreign Application Priority Data
Apr. 29, 2020 (KR) .................. 10-2020-0052259

(51) Int. Cl.
*H01M 50/383* (2021.01)
*H01M 50/258* (2021.01)
*H01M 50/342* (2021.01)

(52) U.S. Cl.
CPC ..... *H01M 50/3425* (2021.01); *H01M 50/258* (2021.01); *H01M 50/383* (2021.01)

(58) Field of Classification Search
CPC ... H01M 50/383; H01M 50/367; H01M 50/35
See application file for complete search history.

(56) References Cited

U.S. PATENT DOCUMENTS

2009/0197153 A1 8/2009 Fujikawa et al.
2012/0288738 A1 11/2012 Yasui et al.
(Continued)

FOREIGN PATENT DOCUMENTS

CN 208422978 U 1/2019
CN 109906524 A 6/2019
(Continued)

OTHER PUBLICATIONS

Machine Translation of JP2014241245A from Espacenet (Year: 2014).*
(Continued)

*Primary Examiner* — Nicholas A Smith
*Assistant Examiner* — Zackary Richard Cochenour
(74) *Attorney, Agent, or Firm* — Birch, Stewart, Kolasch & Birch, LLP (57) ABSTRACT

A battery includes a plurality of battery modules; a venting inducing frame disposed along an edge of the battery modules; and a housing for receiving the battery modules and the venting inducing frame, wherein at least one quenching member is disposed in the venting inducing frame.

14 Claims, 11 Drawing Sheets

(56) References Cited

U.S. PATENT DOCUMENTS

| | | |
|---|---|---|
| 2014/0087234 A1 | 3/2014 | Lent et al. |
| 2014/0308550 A1 | 10/2014 | Shimizu et al. |
| 2014/0322583 A1 | 10/2014 | Choi et al. |
| 2014/0342211 A1 | 11/2014 | Choi et al. |
| 2015/0171391 A1 | 6/2015 | Ahn |
| 2018/0108892 A1 | 4/2018 | Kim et al. |
| 2018/0254444 A1 | 9/2018 | Yoon et al. |
| 2018/0358593 A1 | 12/2018 | Seo et al. |
| 2019/0088914 A1 | 3/2019 | Choi et al. |
| 2019/0097192 A1 | 3/2019 | Kim et al. |
| 2019/0140229 A1 | 5/2019 | Lindstrom et al. |
| 2019/0221797 A1* | 7/2019 | Nierhoff ............ H01M 50/204 |
| 2020/0058973 A1 | 2/2020 | Golubkov |

FOREIGN PATENT DOCUMENTS

| | | |
|---|---|---|
| CN | 110379963 A | 10/2019 |
| CN | 209963101 U | 1/2020 |
| EP | 3 783 688 A1 | 2/2021 |
| JP | 4-162346 A | 6/1992 |
| JP | 2002-151025 A | 5/2002 |
| JP | 2009-212081 A | 9/2009 |
| JP | 2011-254906 A | 12/2011 |
| JP | 2012-79510 A | 4/2012 |
| JP | 2014-160573 A | 9/2014 |
| JP | 2014-165026 A | 9/2014 |
| JP | 2014-241245 A | 12/2014 |
| JP | 2015-509278 A | 3/2015 |
| JP | 2015-510239 A | 4/2015 |
| JP | 2015-529389 A | 10/2015 |
| JP | 5903607 B2 | 4/2016 |
| JP | 2018-527704 A | 9/2016 |
| JP | 2018-54973 A | 4/2019 |
| KR | 10-2015-0069732 A | 6/2015 |
| KR | 10-2017-0047687 A | 5/2017 |
| KR | 10-2017-0074543 A | 6/2017 |
| KR | 10-2018-0006150 A | 1/2018 |
| KR | 10-2019-0031835 A | 3/2019 |
| KR | 10-2019-0036260 A | 4/2019 |
| KR | 10-2013-0027802 A | 4/2025 |
| WO | WO2012/081137 A1 | 6/2012 |
| WO | WO2013/989398 A1 | 5/2013 |
| WO | WO2017/181282 A1 | 10/2017 |

OTHER PUBLICATIONS

International Search Report for PCT/KR2021/004427 mailed on Aug. 6, 2021.

Extended European Search Report for European Application No. 21796164.8, dated Jan. 2, 2023.

* cited by examiner

BATTERY PACK AND DEVICE INCLUDING THE SAME

TECHNICAL FIELD

This application claims priority to and the benefit of Korean Patent Application No. 10-2020-0052259 filed in the Korean Intellectual Property Office on Apr. 29, 2020, the entire contents of which are incorporated herein by reference.

The present invention relates to a battery pack and a device including the same, and in particular, it relates to a safety-improved battery pack and a device including the same.

BACKGROUND ART

Rechargeable batteries having high application characteristics and electrical characteristics such as high energy density according to their products are widely applied to battery powered vehicles, hybrid vehicles, and electric power storage devices driven by electric driving sources, as well as portable devices. These rechargeable batteries are attracting attention as new energy sources for improving environmental friendliness and energy efficiency in that they do not generate any by-products of energy use, as well as their primary merit that they can drastically reduce the use of fossil fuels.

The commercially available secondary batteries include a nickel cadmium battery, a nickel hydrogen battery, a nickel zinc battery, and a lithium secondary battery, and the lithium secondary battery among them scarcely generates a memory effect compared to the nickel-based secondary battery so it is freely charged and discharged, a self-discharge rate is very low, and an energy density is high as merits.

The lithium secondary battery generally uses a lithium-based oxide and a carbon material as a positive active material and a negative active material, respectively. The lithium secondary battery includes an electrode assembly in which a positive electrode plate and a negative electrode plate on which the positive active material and the negative active material are respectively applied are disposed with a separator therebetween, and an exterior material, that is, a battery case, for sealing and receiving the electrode assembly together with an electrolyte solution.

In general, the lithium secondary battery may be classified into a cylindrical or square-type secondary battery of which the electrode assembly is installed in a metal can, and a pouch-type secondary battery of which the electrode assembly is installed in a pouch of an aluminum laminate sheet, depending on a shape of the exterior material.

Recently, as needs for a large-capacity secondary battery structure increase in addition to the use as an energy storing source of the secondary battery, needs for the battery packs in a medium to large module structure in which battery modules in which a plurality of secondary batteries are coupled in series or in parallel are gathered are increasing. Capacity and outputs of the battery modules are improved by coupling a plurality of battery cells in series or in parallel and configuring a battery cell stacked body. Further, a plurality of battery modules may configure a battery pack when installed together with various control and protection systems such as a battery management system (BMS) or a cooling system.

The battery pack has a structure in which a plurality of battery modules are combined, so when some of the battery modules receive an overvoltage or an overcurrent or they are overheated, safety and operation efficiency of the battery pack may be problematic. Particularly, while the capacity of the battery pack is in the increasing trend to improve mileage and energy inside the pack is accordingly increasing, there is a need to design a structure satisfying reinforcing safety standards and obtaining safety of vehicles and drivers. For this purpose, the need for acquiring a structure for preventing internal thermal runaway in advance, and minimizing corresponding damage when the thermal runaway is generated, is particularly on the rise.

DISCLOSURE

The present invention has been made in an effort to provide a safety-improved battery pack and a device including the same.

However, the objective of the present invention is not limited to the aforementioned one, and may be extended in various ways within the spirit and scope of the present invention.

An embodiment of the present invention provides a battery pack including: a plurality of battery modules; a venting inducing frame disposed along an edge of the plurality of battery modules; and a housing for receiving the plurality of battery modules and the venting inducing frame, wherein at least one quenching member is disposed in the venting inducing frame.

The venting inducing frame may include a pair of vertical beams formed in parallel to a first direction and a pair of horizontal beams formed in parallel to a second direction traversing the first direction.

The vertical beams may have a pipe shape including a first cover formed in a length direction of the vertical beams the first direction and a first passage surrounded by the first cover and formed to allow venting material to pass through, and the horizontal beams may have a pipe shape including a second cover formed in the second direction, and a second passage surrounded by the second cover and formed to allow the venting material to pass through.

The quenching member may include at least one first quenching member and at least one second quenching member, and the at least one first quenching member may be disposed in the first passage, and the at least one second quenching member may be disposed in the second passage.

The at least one first quenching member may be spaced from the at least one second quenching member in the first direction.

A number of the at least one first quenching members disposed in the first passage may be equal to or greater than a number of the at least one second quenching members disposed in the second passage.

An amount of a quenching material applied to the at least one second quenching member may be greater than an amount of the quenching material applied to the at least one first quenching member.

The battery module may include: a battery cell stacked body in which a plurality of battery cells are stacked and a module frame for receiving the battery cell stacked body; an end plate for covering the battery cell stacked body exposed to front and rear sides of the module frame; and at least one venting gate communicating with an inside of the battery module on the end plate.

Each horizontal beam may include a first connection hole connected to the venting gate by communicating with the venting gate, and the at least one second quenching member may be disposed near the first connection hole.

The at least one second quenching member may have a same size as or may be bigger than the first connection hole, and the at least one second quenching member may be at a position corresponding to the first connection hole to close and seal a space between the first connection hole and the at least one second quenching member.

Another embodiment of the present invention provides a device including the above-described battery pack.

According to the embodiments, the venting inducing structure is provided in the battery pack, so when an abnormal phenomenon is generated in the battery cell, the safety of the battery pack may be secured by inducing venting gas in a predetermined direction.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the spirit or scope of the present disclosure.

Parts that are irrelevant to the description will be omitted to clearly describe the present invention, and the same elements will be designated by the same reference numerals throughout the specification.

The size and thickness of each configuration shown in the drawings are arbitrarily shown for better understanding and ease of description, but the present invention is not limited thereto. In the drawings, the thickness of layers, films, panels, regions, etc., are exaggerated for clarity. For ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

Unless explicitly described to the contrary, the word "comprise", and variations such as "comprises" or "comprising", will be understood to imply the inclusion of stated elements but not the exclusion of any other elements.

Further, throughout the specification, the phrase "in a plan view" means viewing a target portion from the top, and the phrase "in a cross-sectional view" means viewing a cross-section formed by vertically cutting a target portion from the side.

Figure 1:
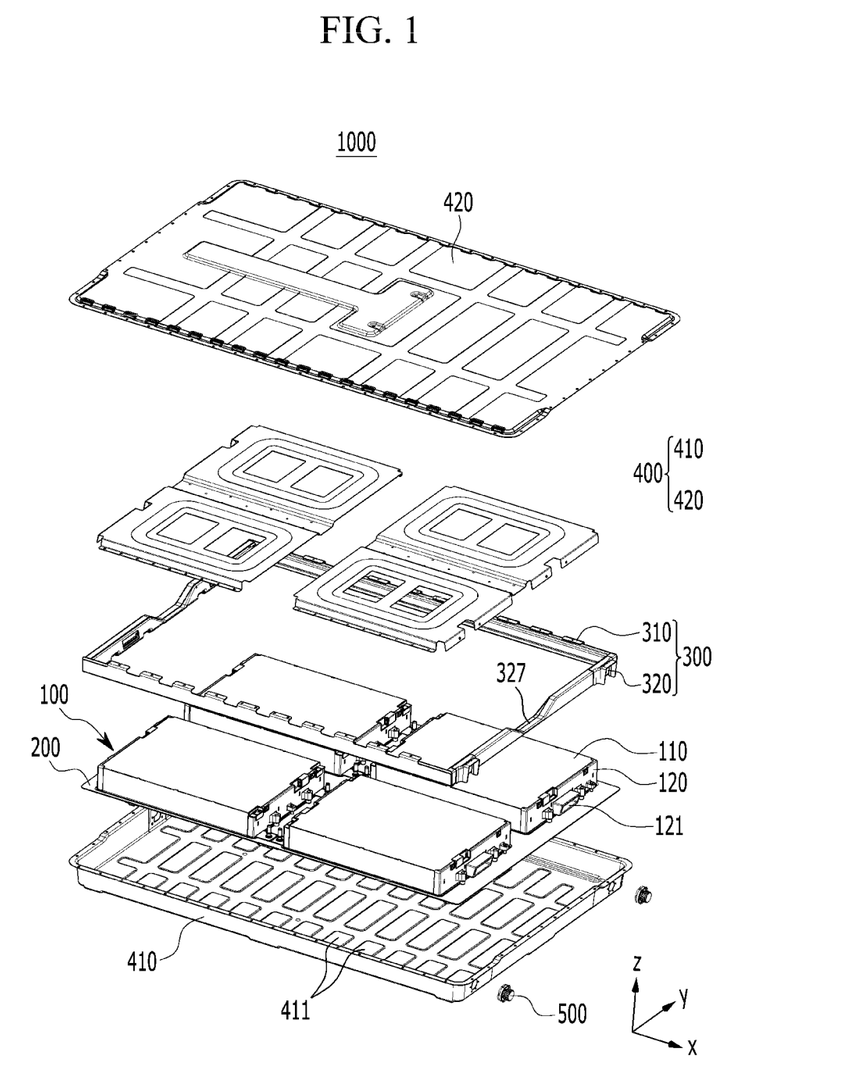
FIG. 1 shows an exploded perspective view of a battery pack according to an embodiment of the present invention.

FIG. 1 shows an exploded perspective view of a battery pack according to an embodiment of the present invention.

Referring to FIG. 1 the battery pack 1000 according to an embodiment of the present invention includes a plurality of battery modules 100, and a venting inducing frame 300 disposed along an edge of a plurality of battery modules 100. The battery modules 100 and the venting inducing frame 300 may be mounted on a pack tray 200 and may be received in a pack housing 400. The pack housing 400 may include a lower housing 410 for receiving the pack tray 200, and an upper cover 420 combined to the lower housing 410 and covering an upper side of the battery module 100.

The battery modules 100 respectively include a battery cell stacked body (not shown) disposed in the module frame 110, and include an end plate 120 for covering the battery cell stacked body exposed to the respective ends of the module frame 110. In this instance, one of the respective end plates 120 includes a venting gate 121 communicating with the inside of the battery module 100 and releasing a flame or heat that may be generated from the inside. In the battery pack 1000, the venting gate 121 is disposed to face an external side of the battery pack 1000, and preferably, as shown in FIG. 1, the venting gate 121 may be disposed to face the external side toward the respective ends in the first direction (x-axis direction) in the battery pack 1000.

A venting inducing frame 300 may be disposed along the edge of all the battery modules 100. The venting inducing frame 300 may include a pair of vertical beams 310 and a pair of horizontal beams 320 formed in a pipe shape along the respective sides of the battery pack 1000 and respectively extending in the first direction (x-axis direction) and the second direction (y-axis direction), and they are formed to communicate with each other as a whole body. A detailed configuration of the venting inducing frame 300 will be described in a later portion of the present specification.

The battery modules 100 and the venting inducing frame 300 may be mounted on the pack tray 200, and it may be fixed to the pack tray 200 by a fixation means if needed. The battery module 100, the venting inducing frame 300, and the pack tray 200 may be received in the lower housing 410. The lower housing 410 may include a bottom side on which the pack tray 200 is disposed, and a side wall extending upward from the edge of the bottom side. An upper cover 420 for covering the upper portion of the battery module 100 may be combined to the lower housing 410 to protect an internal electrical field. In this instance, various control and protection systems such as a battery management system (BMS) and a cooling system together with the battery module 100 may be installed in the pack housing 400.

At least one rupture portion 500 for discharging heat or flame generated from the inside to the outside may be formed on one side wall of the lower housing 410. A detailed configuration of the rupture portion 500 will be described in a later portion of the present specification.

A venting inducing frame of a battery pack according to an embodiment of the present invention will now be described in detail.

Figure 2:
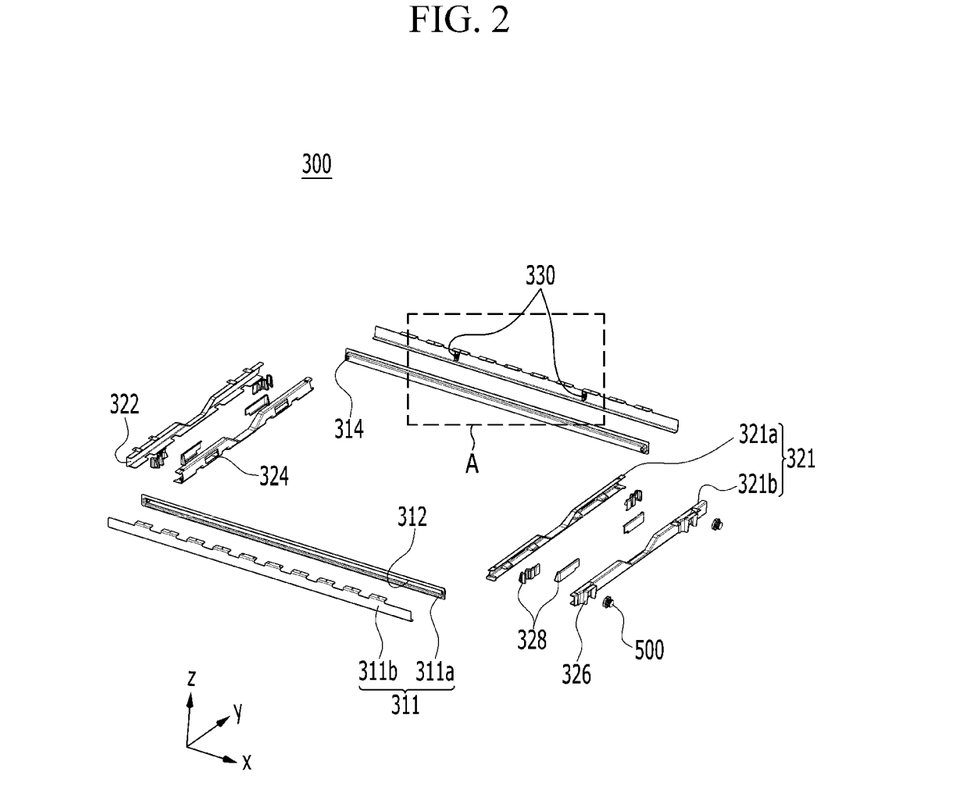
FIG. 2 shows an exploded perspective view of a venting inducing frame in a battery pack of FIG. 1.

FIG. 2 shows an exploded perspective view of a venting inducing frame in a battery pack of FIG. 1.

Referring to FIG. 1 and FIG. 2, the venting inducing frame 300 is formed in a pipe shape along the respective sides of the battery pack 1000, it may include a pair of vertical beams 310 and a pair of horizontal beams 320 respectively extending in the first direction (x-axis direction) and the second direction (y-axis direction), and they are formed to communicate with each other as a whole body.

The vertical beams 310 have a pipe shape lengthily extending in the first direction (x-axis direction), and includes a cover 311 for defining an inside of the pipe shape, and a passage 312 formed inside the cover 311. The cover 311 may include a first internal cover 311a disposed near the battery module 100 in the second direction (y-axis direction), and a first external cover 311b facing the same and disposed to become distant from the battery module 100 in the second direction (y-axis direction). At least one of the first internal cover 311a and the first external cover 311b includes a groove lengthily formed in the first direction. That is, its cross-section is formed to have a "⊏" shape (formed to have a shape in which one side is removed from a square pipe shape), and the cover of the other is combined thereto to thus define the passage 312. However, it is not limited thereto as long as the pipe shape may be obtained by the cover 311.

The horizontal beams 320 have a pipe shape lengthily extending in the second direction (y-axis direction), and includes a cover 321 for defining an inside of the pipe shape, and a passage 322 formed inside the cover 321. The cover 321 may include a second internal cover 321a disposed near the battery module 100 in the first direction (x-axis direction), and a second external cover 321b facing the same and disposed to become distant from the battery module 100 in the first direction (x-axis direction). At least one of the second internal cover 321a and the second external cover 321b includes a groove lengthily formed in the second direction That is, its cross-section is formed to have a "⊏" shape (formed to have a shape in which one side is removed from a square pipe shape), and the cover of the other is combined thereto to thus define the passage 322. Particularly, in the present embodiment, as shown in FIG. 2, the second internal cover 321a and the second external cover 321b may be respectively formed to have a "⊏" shaped cross-section, and by this, rigidity when the horizontal beams 320 are assembled may be increased. However, it is not limited thereto when the pipe shape may be obtained by the cover 321.

The horizontal beams 320 include a first connection hole 324 formed on the side facing the battery module 100, that is, one side of the second internal cover 321a. The first connection hole 324 is disposed to communicate with the venting gate 121 of the battery module 100. The horizontal beams 320 further includes a third connection hole 326 formed on the side disposed in a direction becoming distant in the second direction from the battery module 100, that is, one side of the second external cover 321b. The third connection hole 326 is disposed so that the rupture portion 500 may communicate with the passage 322. In this instance, the venting path bracket 328 may combine the rupture portion 500 and the horizontal beams 320 to guide the path for the venting gate 121, the passage 322 of the horizontal beams 320, and the rupture portion 500 to communicate with each other.

The vertical beams 310 include a second connection hole 314 formed on the first internal cover 311a at the respective ends disposed near the horizontal beams 320. The passage 322 of the horizontal beams 320 may communicate with the passage 312 of the vertical beams 310 through the second connection hole 314.

The rupture portion 500 is connected to the passage 322 of the horizontal beams 320, and includes a rupture side (510, shown in FIG. 5B) that is broken when input gas has more than a predetermined level of pressure. Further, the rupture portion 500 includes a wing portion (520, shown in FIG. 5B) protruding from a body on which the rupture side 510 is formed and combining to the side wall of the lower housing 410. The wing portion 520 may be fixed to the lower housing 410 by use of a fastening means such as a screw. In the present embodiment, the rupture portion 500 is connected to the passage 322 of the horizontal beams 320, and the rupture portion 500 is fixed to the horizontal beams 320 and the lower housing 410, and without being limited thereto, configurations for communicating with the passage of the venting inducing frame 300 and discharging to the outside may be appropriately used. Further, the formation of two rupture portions 500 on one of the one pair of horizontal beams 320 is exemplified in the present embodiment, and without being limited thereto, the rupture portion 500 may be installed in the horizontal beams 320 on another side, or it may be installed in the vertical beams 310, and corresponding positions and numbers may be appropriately selected as needed.

Referring to FIG. 2, in the present embodiment, at least one quenching member 330 may be disposed in the venting inducing frame 300 in addition to the above-described configuration. The quenching member 330 may be disposed inside one of the passage 312 of the vertical beams 310 and the passage 322 of the horizontal beams 320. The quenching member 330 may be dispose along a venting guiding path formed by the passage 312 of the vertical beams 310 and the passage 322 of the horizontal beams 320. A detailed configuration of the quenching member 300 will be described in a later portion of the present specification.

By the above-noted configuration, the passage is formed to communicate with all components inside the venting inducing frame 300 in a square shape configured with the vertical beams 310 and the horizontal beams 320, and the passage communicates with the venting gate 121 of the battery module 100 and the rupture portion 500 to induce heat and flame to the outside and minimize the influence to peripheral battery modules when thermal runaway is generated from the battery module 100. In this instance, the flame included in the generated high-pressure venting gas is combusted while passing through the path inside the venting inducing frame 300 and it may be discharged to the outside in a safer way. In the normal condition without thermal runaway, the venting inducing frame 300 may function as a support frame for stably supporting the battery module 100 and may improve stability of the battery pack 1000.

A path for controlling a case in which issues such as overvoltage, overcurrent, or overheating are generated in some battery modules in the battery pack will now be described.

Figure 3:
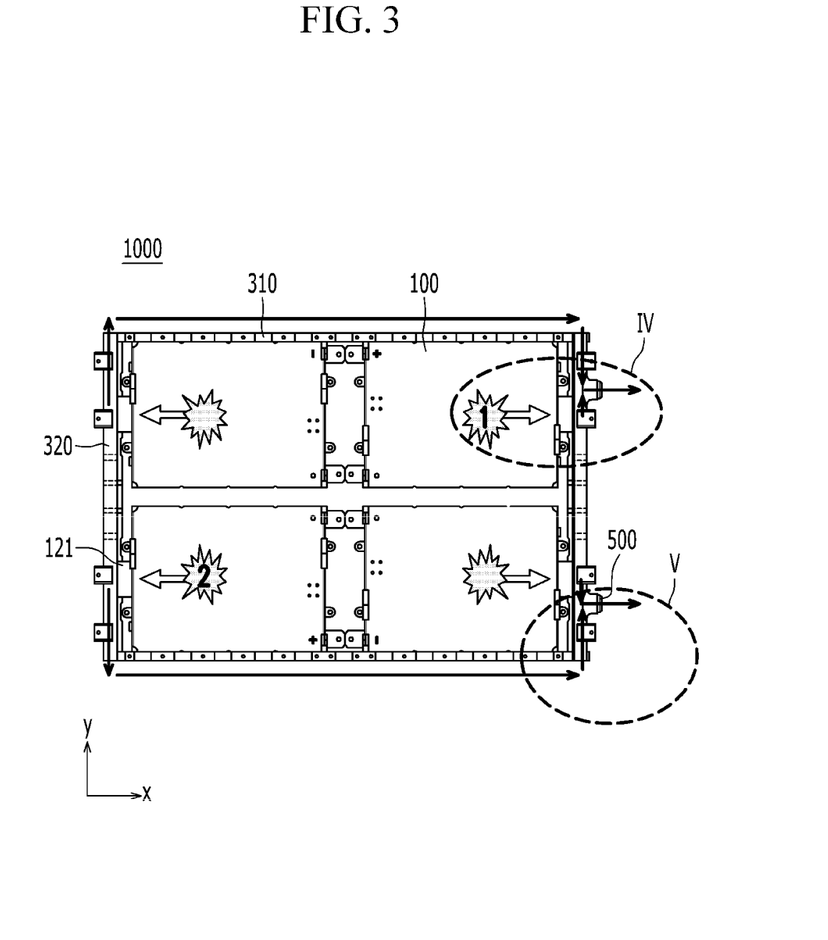
FIG. 3 shows a mimetic diagram of a transfer path when thermal runaway is generated in a certain module of a battery pack according to an embodiment of the present invention.
Figure 4:
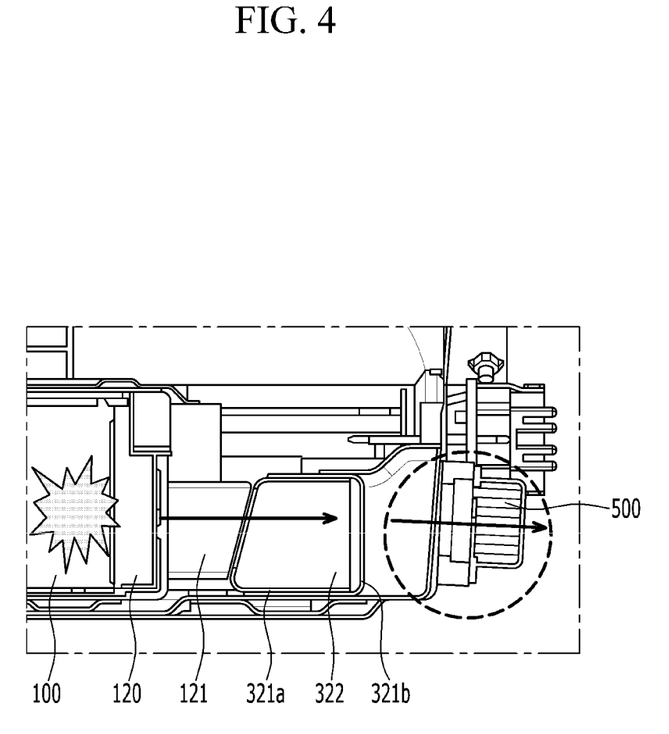
FIG. 4 shows an enlarged portion of a portion IV of FIG. 3.
Figure 5A:
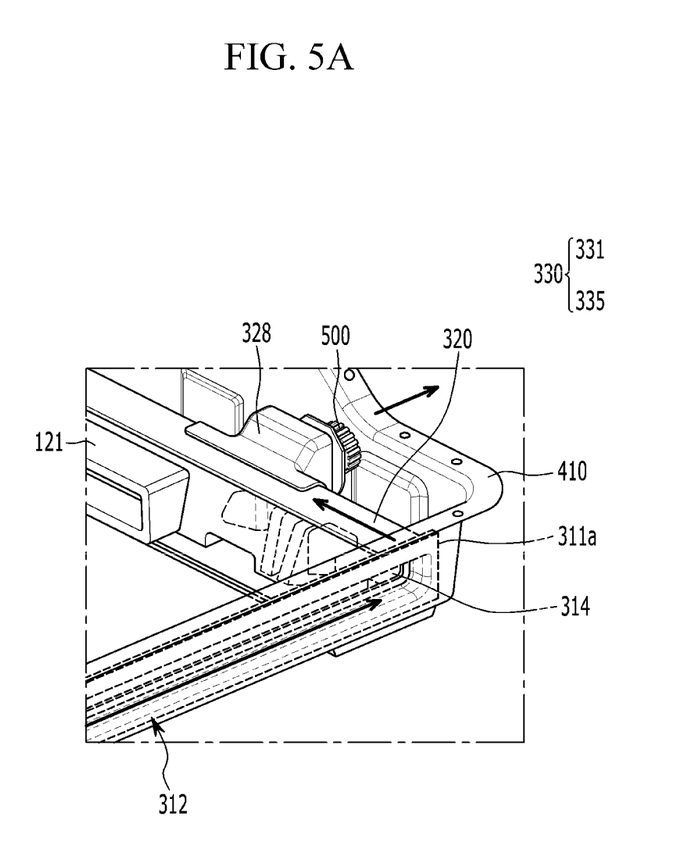
FIG. 5A and FIG. 5B show an enlarged portion of a portion V of FIG. 3.
Figure 5B:
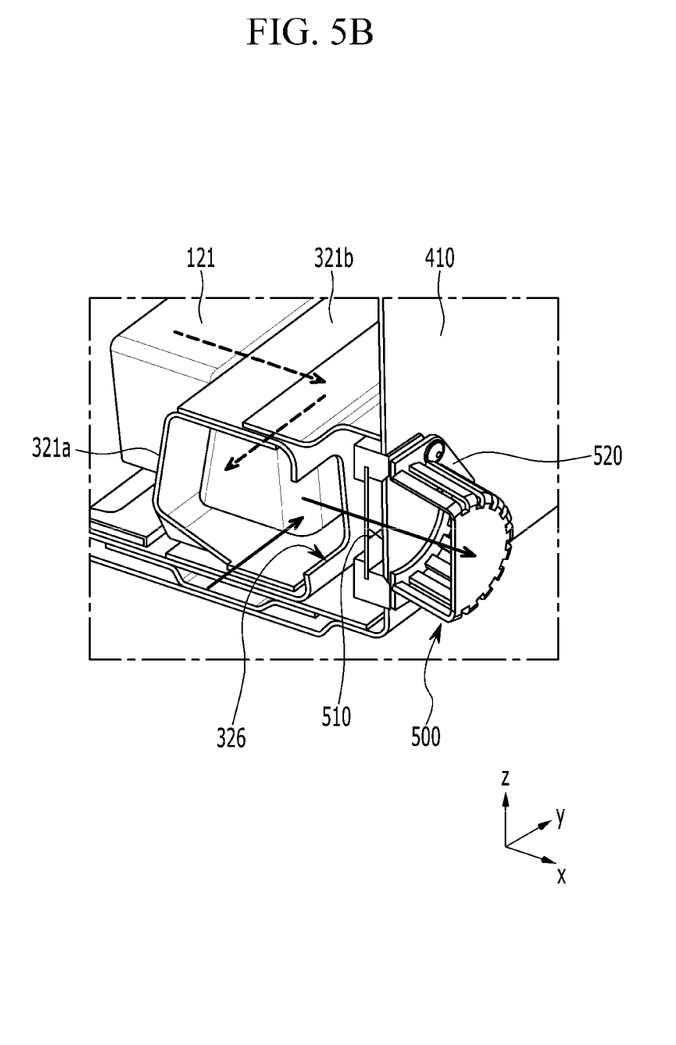

FIG. 3 shows a mimetic diagram of a transfer path when thermal runaway is generated in a certain module of a battery pack according to an embodiment of the present invention. FIG. 4 shows an enlarged portion of IV of FIG. 3. FIG. 5A and FIG. 5B show an enlarged portion of V of FIG. 5.

Referring to FIG. 1 to FIG. 5, when abnormal phenomena (heat issues) such as overvoltage, overcurrent, or overheating are generated in the battery module 100, high-pressure venting gas is discharged from the inside of the battery module 100 through the venting gate 121. In this instance, high-temperature and high-pressure gas and flames are induced to the first connection hole 324 positioned nearest the venting gate 121 of the battery module 100 in which heat is generated. The high-temperature and high-pressure gas and flames input through the first connection hole 324 may be discharged to the outside through the passage formed in the venting inducing frame 300.

For example, when heat is generated in the battery module 100 disposed on the position 1 in FIG. 3, as shown in FIG. 4, the high-pressure gas and flames may be discharged through the venting gate 121, may pass through the passage 322 of the horizontal beams 320, may be directly induced to the rupture portion 500, and may be discharged to the outside. By this, the heat generated by the battery module 100 on the position 1 may be discharged to the outside without giving an influence to the peripheral module.

Further, when heat is generated in the battery module 100 disposed on the position 2 in FIG. 3, as shown in FIG. 5A and FIG. 5B, the high-temperature and high-pressure gas and flames are discharged through the venting gate 121, and are input to the passage 322 of the horizontal beams 320. The high-temperature and high-pressure gas and flames having been input to the passage 312 of the vertical beams 310 through the second connection hole 314 and having moved along the passage 312 may be induced to the horizontal beams 320 on the side where the rupture portion 500 is positioned, and may be finally discharged to the outside through the rupture portion 500 through the second connection hole 314 formed on the opposite end of the corresponding vertical beams 310. That is, when heat is generated in the battery module 100, high-temperature and high-pressure gas and flames may be induced and may be finally discharged to the outside on the passage of the venting inducing frame 300 through the first connection hole 324 positioned the nearest the venting gate 121 of the corresponding battery module 100.

Figure 6:
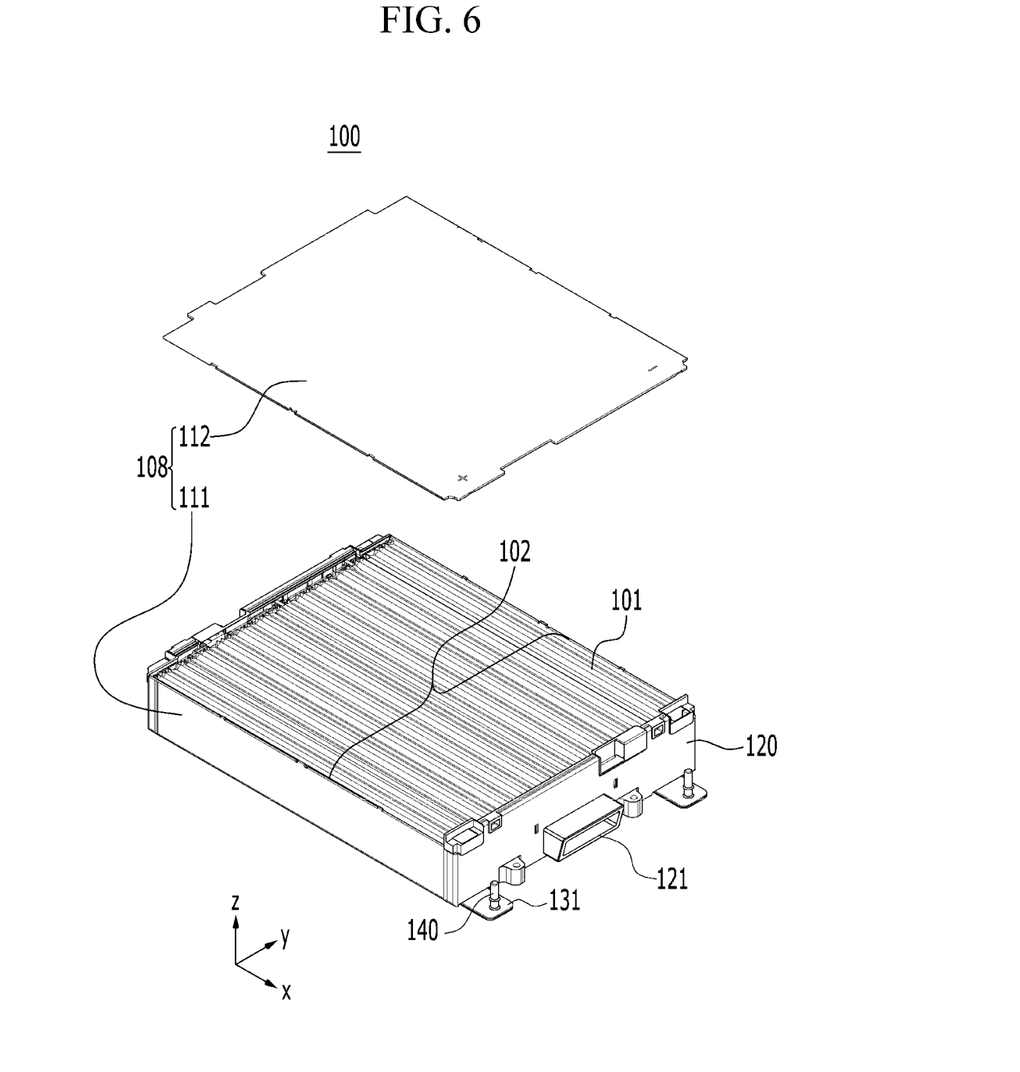
FIG. 6 shows a perspective view of a battery module included in a battery pack of FIG. 1.
Figure 7:
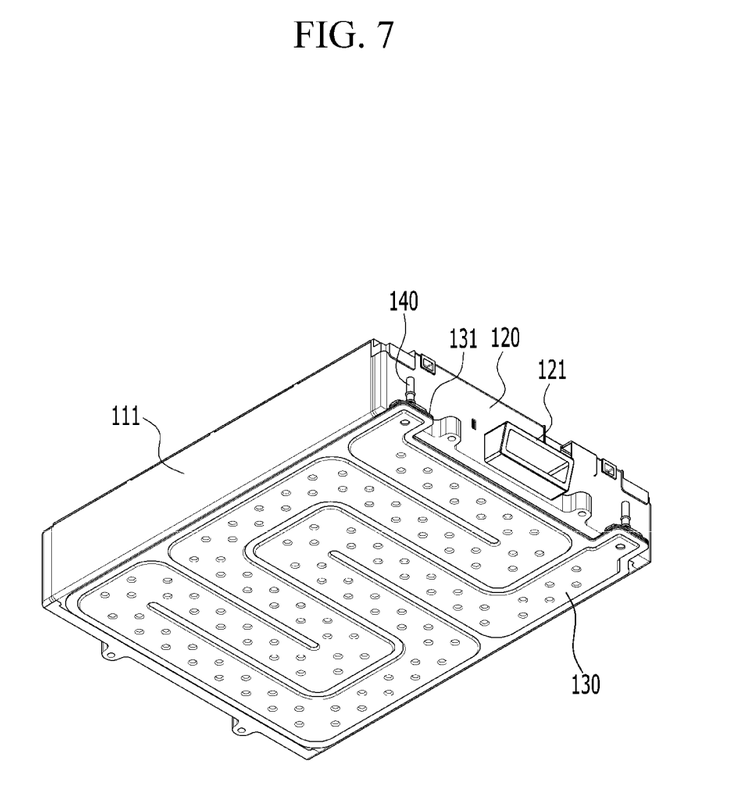
FIG. 7 shows a perspective view of a battery module of FIG. 6 seen from bottom to top in a z-axis direction.

FIG. 6 shows a perspective view of a battery module included in a battery pack of FIG. 1. FIG. 7 shows a perspective view of a battery module of FIG. 6 seen from bottom to top in a z-axis direction.

Referring to FIG. 6 and FIG. 7, the battery module 100 included in the battery pack of FIG. 1 may include a battery cell stacked body 102 in which a plurality of battery cells 101 are stacked, a module frame 108 for receiving the battery cell stacked body 102, and an end plate 120. The battery cells 101 are stacked to be mutually electrically connected to each other to configure the battery cell stacked body 102. Particularly, as shown in FIG. 6, a plurality of battery cells 101 may be stacked in a direction that is parallel to the y-axis.

In this instance, the battery cell stacked body 102 according to an embodiment of the present invention may be a large-area module including a greater number of the battery cells 101 than the prior art. For example, 48 battery cells 101 may be included per battery module 100. Regarding the large-area module, a horizontal direction length of the battery module becomes long. In this instance, the horizontal direction length may signify a direction in which the battery cells 101 are stacked, that is, the length in the direction that is parallel to the y-axis.

The module frame 108 for receiving the battery cell stacked body 102 may include an upper plate 112 and a lower frame 111. The lower frame 111 may be a U-shaped frame. The U-shaped frame may include a bottom portion and two lateral portions extending upward from respective ends of the bottom portion. The bottom portion may cover a lower side (an opposite direction of a z axis) of the battery cell stacked body 102, and the lateral portions may cover respective lateral sides (the y-axis direction and its opposite direction) of the battery cell stacked body 102.

The upper plate 112 may be formed to have a one plate-shaped structure for surrounding a remaining upper side (z-axis direction) excluding the lower side and the respective sides surrounded by the U-shaped frame. The upper plate 112 and the lower frame 111 may be combined to each other by welding while corresponding corners contact each other, thereby configuring a structure for covering the battery cell stacked body 102 from top to bottom and from right to left. The battery cell stacked body 102 may be physically protected through the upper plate 112 and the lower frame 111. For this purpose, the upper plate 112 and the lower frame 111 may include a metallic material with predetermined rigidity.

A venting gate 121 for communicating with an inside of the battery module 100 and releasing a flame or heat that may be generated in the inside is disposed on the end plate 120 according to the present embodiment. The venting gate 121 may be provided on a lower side of the end plate 120 by considering a connector connecting portion for transmitting information.

The module frame 108 may include a module frame protrusion 131 formed so that the bottom portion of the module frame 108 may extend to pass through the end plate 120. In this instance, a coolant input and output by a cooling port 140 connected to an upper side of the module frame protrusion 131 may be supplied to/discharged from a heat sink 130 through the module frame protrusion 131.

Figure 8:
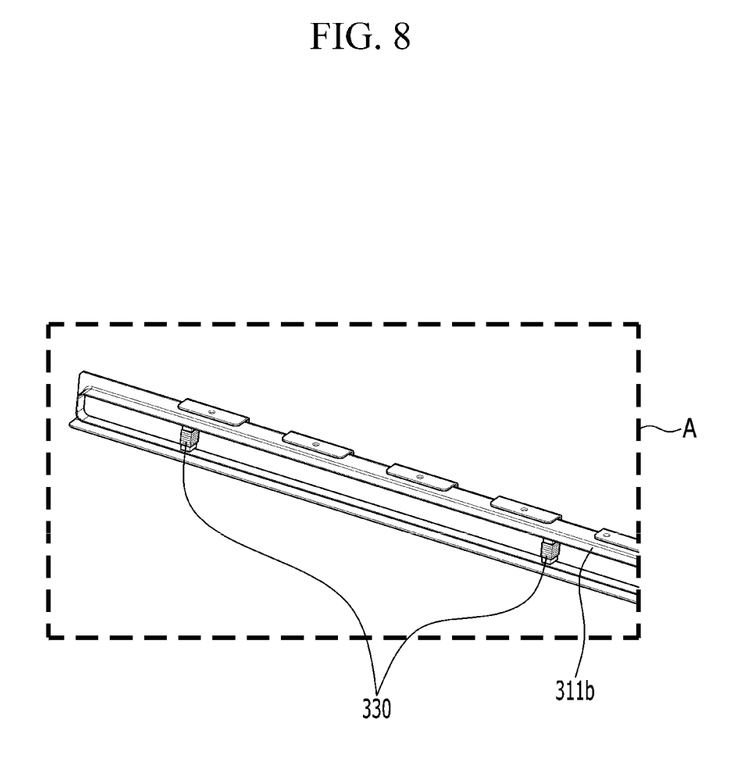
FIG. 8 shows an enlarged portion A of FIG. 2.

FIG. 8 shows an enlarged portion A of FIG. 2.

A path for controlling troubles such as an overvoltage, an overcurrent, or overheating are generated in some battery modules in the battery pack will now be described with reference to the quenching member 330 according to the present embodiment.

Referring to FIG. 8, the quenching member 330 may be disposed inside the venting inducing frame 300. At least part of the venting material discharged from the battery module 100 through the venting gate 121 may pass through the quenching member 330. The venting material includes at least one of high-temperature and high-pressure gas and flames. Particularly, the quenching member 330 blocks the flames from among the venting material discharged from the inside of the battery module 100 from being discharged to the outside. That is, the quenching member 330 may remove the flames from among the venting material discharged from the inside of the battery module 100, and a gas from which the flames are removed may be discharged to the outside from the battery pack 1000.

Here, the quenching member 330 may have a structure such as a mesh or a pipe, so the high-temperature and high-pressure gas from among the venting material discharged from the inside of the battery module 100 passes through the quenching member 330 and is then discharged to the outside, and the flames from among the venting material may be filtered and removed by the quenching member 330. Accordingly, the quenching member 330 blocks the flames from spreading in the battery pack 1000 to prevent a gasket in the battery pack 1000 from melting. The quenching member 330 may prevent generation of an additional event that flames belch out to the outside of the battery pack. However, the quenching member 330 is not limited to the above-described structure, and any structures for removing flames and allowing a gas to pass through from among the venting material are not restricted.

Regarding the quenching member 330, the number of the quenching members 330 disposed in the venting inducing frame 300 may be modified or the material configuring the quenching member may be changed according to the constituent materials included by the battery cell 101 of FIG. 6.

For example, when intensity or temperature of the flames discharged when heat is generated to the constituent material included by the battery cell 101 of FIG. 6 is relatively high, a relatively large number of the quenching members 330 may be disposed in the venting inducing frame 300, or a relatively large amount of the quenching material may be applied to the quenching member 330. On the contrary, when the intensity or the temperature of the flames discharged when heat is generated to the constituent material included by the battery cell 101 is relatively low, a relatively small number of the quenching members 330 may be disposed in the venting inducing frame 300, or a relatively small amount of the quenching material may be applied to the quenching member 330. Preferably, it may be simpler and easier to adjust the number of quenching members 330 according to the intensity of flames or the temperature in consideration of the manufacturing process and the manufacturing time.

Figure 9:
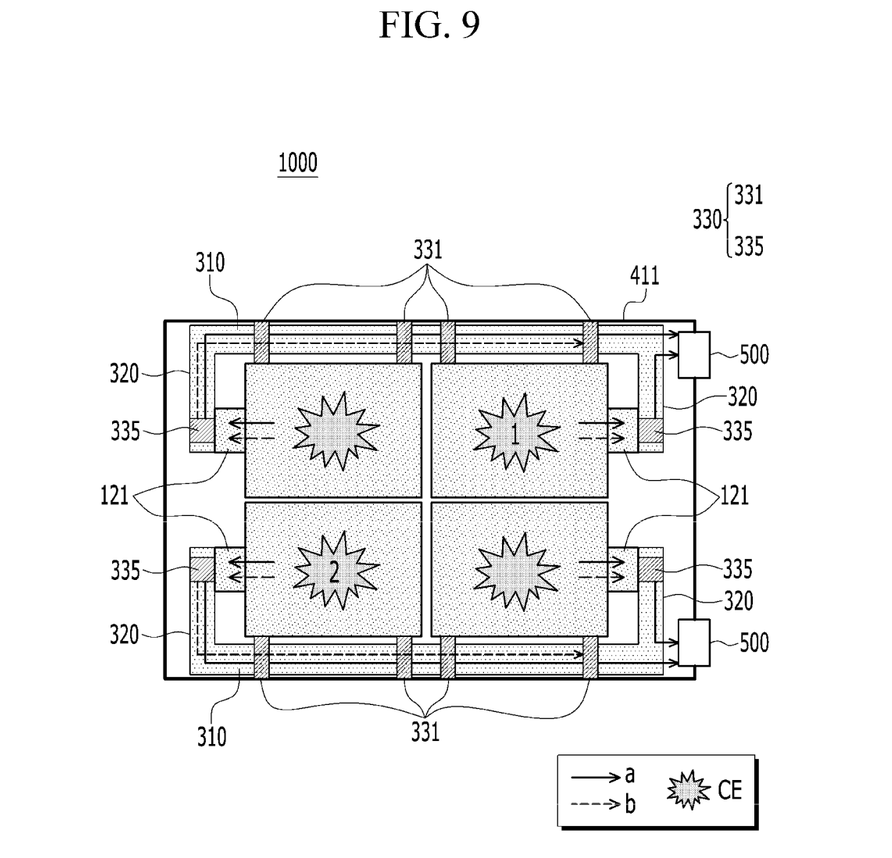
FIG. 9 shows a schematic diagram on a flow of a venting material when an abnormal phenomenon is generated from a battery pack according to an embodiment of the present invention.
Figure 10:
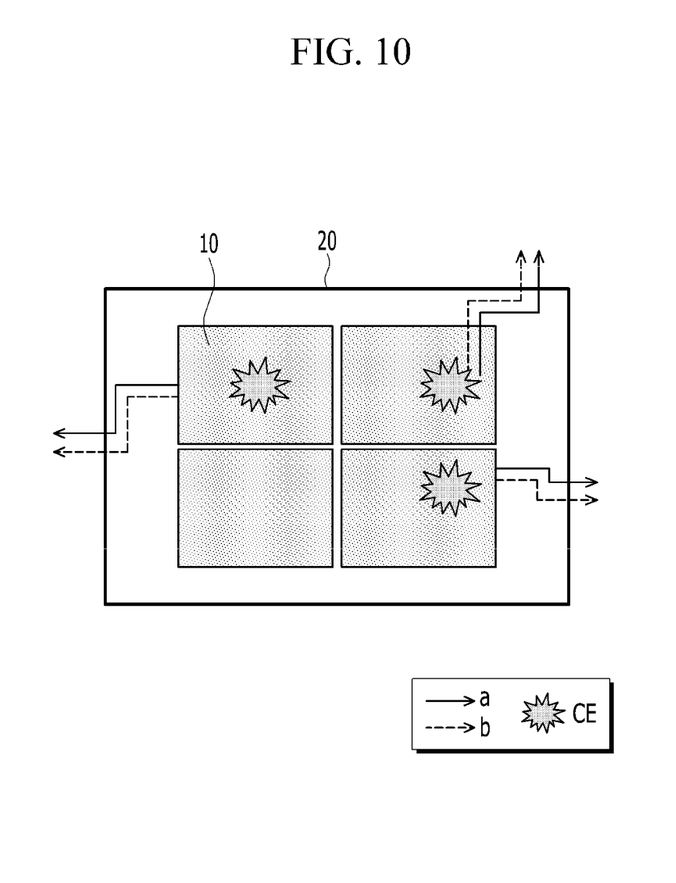
FIG. 10 shows a schematic diagram of a flow of a venting material when an abnormal phenomenon is generated from a battery pack according to a comparative example.

FIG. 9 shows a schematic diagram on a flow of a venting material when an abnormal phenomenon is generated from a battery pack according to an embodiment of the present invention. FIG. 10 shows a schematic diagram on a flow of a venting material when an abnormal phenomenon is generated from a battery pack according to a comparative example.

In FIG. 9 and FIG. 10, a is a gas flow, b is a flame flow, and CE is a cell event. For example, the cell event (CE) signifies that abnormal phenomena (heat issues) such as an overvoltage, an overcurrent, or overheating are generated in the battery module 100, and the high-pressure venting gas is discharged from the inside of the battery module 100 through the venting gate 121.

Regarding the battery pack 1000 according to the present embodiment, the quenching member 330 may be disposed in at least one of the vertical beams 310 and the horizontal beams 320 configuring the venting inducing frame 300. The quenching member 330 may be respectively disposed in at least one of the vertical beams 310 and the horizontal beams 320 configuring the venting inducing frame 300. Accordingly, the quenching member 330 is included in the path of the venting material induced by the venting inducing frame 300, the flame-removed venting gas is discharged to the outside, and safety of the battery pack 1000 may be increased.

For example, referring to FIG. 2, FIG. 8, and FIG. 9, the quenching member 330 may include a first quenching member 331 and a second quenching member 335. The first quenching member 331 is positioned inside the vertical beams 310, and the second quenching member 335 is positioned inside the horizontal beams 320.

The vertical beams 310 includes at least one first quenching member 331, and when it includes a plurality of first quenching members 331, the first quenching members 331 may be disposed at predetermined intervals. The vertical beams 310 may include a relatively greater number of first quenching members 331 than the horizontal beams 320, so the flames may be efficiently removed from the vertical beams 310 compared to the horizontal beams 320. The more the first quenching member 331 becomes distant from the position on which the cell event (CE) is generated, an applied amount of the quenching material may be less, a size thereof may be less, or a gap between the first quenching members 331 may increase, thereby reducing a manufacturing cost of the battery pack 1000 and simplifying the manufacturing process.

The horizontal beams 320 may include at least one second quenching member 335, and the second quenching member 335 may be positioned near the venting gate 121 of the battery module 100. Referring to FIG. 2, the second quenching member 335 may have a size same as or may be bigger than the first connection hole 324, and the second quenching member 335 may be combined to a position corresponding to the first connection hole 324 so as to close and seal a gap between the first connection hole and the second quenching member.

Hence, the second quenching member 335 may reduce the amount of flames generated by the cell event (CE) of the battery module 100. The flames may not leak between the venting gate 121 and the horizontal beams 320. A region between the venting gate 121 and the horizontal beams 320 may be prevented from melting by the flames generated by the cell event (CE) of the battery module 100.

The second quenching member 335 is disposed nearest the position where the cell event (CE) is generated, so the applied amount of the quenching material may be big or the size thereof will be big, compared to the first quenching member 331. Therefore, the second quenching member 335 may remove a greater amount of flames than the first quenching member 331, and the battery pack 1000 may obtain higher stability.

Referring to FIG. 9, when a cell event (CE) is generated from the initial battery cell in the battery pack 1000 according to the present embodiment, the venting gas from the battery cell 101 shown in FIG. 7 and FIG. 8 is discharged to the outside of the battery module 100 through the venting gate 121. Particularly, regarding the battery pack 1000 according to the present embodiment, the venting material generated by the battery module 100 may be discharged through the venting gate 121, and the gas and the flames may be differently controlled.

From among the venting material, the gas may flow to the rupture portion 500 from the venting gate 121 according to a first flow (a) marked with a dotted line in FIG. 9. In this instance, the gas may pass through the quenching member 330 and may then flow, thereby preventing an explosion accident according to an increase of the pressure caused by the gas.

From among the venting material, the flames may be prevented from flowing to the rupture portion 500 from the venting gate 121 according to a second flow (b) marked with a dotted line in FIG. 9. As the flames pass through the quenching member 330, their flowing amount may be gradually reduced. The flames from among the venting material generated by the cell event (CE) may be selectively removed in the battery module 100. While the flames may be induced to flow into the venting inducing frame 300, the flames may be more efficiently removed as the quenching member is disposed on the flow path (b) of the flames.

Therefore, the battery pack 1000 according to the present embodiment includes at least one quenching member 330 in the venting inducing frame 300, so as the venting gas in the battery pack 1000 is controlled and the flames are simultaneously selectively removed, safety may be substantially increased.

Referring to FIG. 10, the conventional battery pack 20 does not have systems such as the venting inducer, the venting gate, and the venting inducing frame according to embodiments of the present invention, so the venting gas and flames generated by the battery module 10 may be sporadically discharged. Differing from this, as described above, the battery pack 1000 according to the present embodiment may induce the venting gas and the flames to come out on a predetermined path and may discharge the flame-removed gas to the outside, thereby increasing safety and preventing generation of additional cell events.

The above-described battery module and the battery pack including the same are applicable to various types of devices. The devices include transport means such as electric bicycles, electric vehicles, and hybrid vehicles, but the present invention is not limited thereto, and it may be applied to various devices that use the battery module and the battery pack including the same, which also belongs to the scope of the present invention.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

121: venting gate
200: pack tray
300: venting inducing frame
310: vertical beams
320: horizontal beams
311: cover of vertical beams
312: passage of vertical beams
321: cover of horizontal beams
322: passage of horizontal beams
324: first connection hole
314: second connection hole
326: third connection hole
400: housing
500: rupture portion

The invention claimed is:

1. A battery pack comprising:
   a plurality of battery modules;
   a venting inducing frame disposed along an edge of the plurality of battery modules, the venting inducing frame forming a passage with an inlet and an outlet; and
   a housing for receiving the plurality of battery modules and the venting inducing frame,
   wherein at least one quenching member is disposed in the venting inducing frame between the inlet and the outlet.

2. The battery pack of claim 1, wherein the venting inducing frame includes a pair of vertical beams formed in parallel to a first direction and a pair of horizontal beams formed in parallel to a second direction traversing the first direction.

3. The battery pack of claim 2, wherein the vertical beams have a pipe shape including a first cover formed in the first direction and a first passage surrounded by the first cover and formed to allow venting material to pass through, and
   wherein the horizontal beams have a pipe shape including a second cover formed in the second direction, and a second passage surrounded by the second cover and formed to allow the venting material to pass through.

4. The battery pack of claim 3, wherein the quenching member includes at least one first quenching member and at least one second quenching member, and
   wherein the at least one first quenching member is disposed in the first passage, and the at least one second quenching member is disposed in the second passage.

5. The battery pack of claim 4, wherein the at least one first quenching member is spaced from the at least one second quenching member in the first direction.

6. The battery pack of claim 4, wherein a number of the at least one first quenching member disposed in the first passage is equal to or greater than a number of the at least one second quenching member disposed in the second passage.

7. The battery pack of claim 4, wherein an amount of a quenching material applied to the at least one second quenching member is greater than an amount of the quenching material applied to the at least one first quenching member.

8. The battery pack of claim 4, wherein the battery module includes:
   a battery cell stacked body in which a plurality of battery cells are stacked and a module frame for receiving the battery cell stacked body;
   an end plate for covering the battery cell stacked body exposed to front and rear sides of the module frame; and
   at least one venting gate communicating with an inside of the battery module on the end plate.

9. The battery pack of claim 8, wherein each horizontal beam includes a first connection hole connected to the venting gate by communicating with the venting gate, and
   wherein the at least one second quenching member is disposed near the first connection hole.

10. The battery pack of claim 9, wherein the at least one second quenching member has a same size as or is bigger than the first connection hole, and
    wherein the at least one second quenching member is at a position corresponding to the first connection hole to close and seal a space between the first connection hole and the at least one second quenching member.

11. A device including the battery pack according to claim 1.

12. The battery pack of claim 1, wherein the venting inducing frame has an open top and an open bottom and fits around the plurality of battery modules.

13. The battery pack of claim 12, wherein the housing has sidewalls,
    wherein the sidewalls of the housing have at least one outlet, and
    wherein venting inducing frame connects to the at least one outlet.

14. The battery pack of claim 13, further comprising a venting path bracket between the venting inducing frame and the at least one outlet.

* * * * *